United States Patent
Lee

(10) Patent No.: US 8,483,948 B2
(45) Date of Patent: Jul. 9, 2013

(54) NAVIGATION SYSTEM AND METHOD FOR EXCHANGE MUTUAL LOCATION INFORMATION USING MESSENGER

(75) Inventor: Hee Back Lee, Seoul (KR)

(73) Assignee: Thinkware Systems Corporation, Seoul (KR)

( * ) Notice: Subject to any disclaimer, the term of this patent is extended or adjusted under 35 U.S.C. 154(b) by 171 days.

(21) Appl. No.: 12/811,265

(22) PCT Filed: Jun. 29, 2008

(86) PCT No.: PCT/KR2008/003784
§ 371 (c)(1),
(2), (4) Date: Jun. 30, 2010

(87) PCT Pub. No.: WO2009/084785
PCT Pub. Date: Jul. 9, 2009

(65) Prior Publication Data
US 2010/0292919 A1    Nov. 18, 2010

(30) Foreign Application Priority Data

Dec. 31, 2007   (KR) .................... 10-2007-0141677

(51) Int. Cl.
*G01C 21/00*     (2006.01)
(52) U.S. Cl.
USPC ........... 701/409; 271/431; 271/440; 271/468; 271/482; 271/519
(58) Field of Classification Search
USPC ............... 701/400, 408, 409, 431, 432, 440, 701/468, 482, 519
See application file for complete search history.

(56) References Cited

U.S. PATENT DOCUMENTS

| | | |
|---|---|---|
| 2004/0148090 A1 | 7/2004 | Melen |
| 2004/0203901 A1 | 10/2004 | Wilson et al. |
| 2007/0078595 A1 | 4/2007 | Song |
| 2007/0146199 A1 | 6/2007 | Huang et al. |
| 2009/0157287 A1* | 6/2009 | Shafaat et al. ................ 701/120 |

FOREIGN PATENT DOCUMENTS

| | | |
|---|---|---|
| EP | 1447647 A2 | 8/2004 |
| GB | 2385748 A | 8/2003 |
| JP | 08-212497 A | 8/1996 |
| JP | 9-210701 | 8/1997 |
| JP | 2001-243596 | 9/2001 |
| JP | 2002-288788 | 10/2002 |
| KR | 10-2002-0051791 | 6/2002 |

OTHER PUBLICATIONS

International Search Report for PCT/KR2008/003784, mailed Jan. 14, 2009.
Written Opinion for PCT/KR2008/003784, mailed Jan. 14, 2009.
European Search Report issued on Feb. 1, 2012, by the European Patent Office for the corresponding Korean Patent Application No. 10-2007-0141677.

* cited by examiner

*Primary Examiner* — David H Bollinger
(74) *Attorney, Agent, or Firm* — Nixon & Vanderhye PC

(57) ABSTRACT

A navigation system and method of exchanging location information through a messenger. The navigation system exchanging location information through a messenger, the navigation system includes a messenger program-installed navigation device which includes a communication device, transmits/receives messenger information including the location information to/from another navigation device, and displays the location information received through the message program on a map for route guidance.

13 Claims, 4 Drawing Sheets

NAVIGATION SYSTEM AND METHOD FOR EXCHANGE MUTUAL LOCATION INFORMATION USING MESSENGER

This application is the U.S. national phase of International Application No. PCT/KR2008/003784 filed 29 Jun. 2008 which designated the U.S. and claims priority to KR Patent Application No. 10-2007-0141677 filed 31 Dec. 2007, the entire contents of each of which are hereby incorporated by reference.

TECHNICAL FIELD

The present invention relates to a navigation system and method of exchanging location information through a messenger, and more particularly, to a navigation system and method where a messenger program-installed navigation device shares location information of the navigation device with another navigation device through the messenger.

BACKGROUND ART

A navigation system provides guidance about a route using a Global Positioning System (GPS). A navigation system may include 24 GPS satellites, a GPS receiver, and a navigation device. The GPS receiver receives a location signal and/or a time signal (hereinafter, referred to as "GPS signal") of each satellite from at least three satellites of the 24 satellites. A navigation device stores map data including roads, buildings, mountains, rivers, and the like throughout a country. Also, a navigation device calculates its location from the received GPS signals, map-matches and displays the location to the map data.

The above-described navigation system may receive an intermediate point and a destination from a user and select a route from a current location to the destination according to a predetermined route selection method. Also, the navigation system may match the route to the map data, and provide guidance about a driving direction of the navigation device to the destination based on the route. A driver, that is, a user who does not know the route to the destination, may be provided with a location of the user and the route to the destination.

In a conventional art, a destination may be displayed using only map. Accordingly, it may be easy to provide guidance about a route to a building registered in a map or a building greater than a predetermined size. However, when a user goes to a building not displayed on a map, the user is required to set a destination around the desired building and ask someone who has information about the building to find the building.

Also, in a conventional art, when drivers of a plurality of vehicles desire to go to a same destination or move together, a location of each of the plurality of vehicles may not be provided to each other although a navigation device is installed in each of the plurality of vehicles. Accordingly, the drivers of the plurality of vehicles are required to contact each other using a mobile terminal, input a destination, and set a route.

DISCLOSURE OF INVENTION

Technical Goals

The present invention provides a navigation system and method of exchanging location information through a messenger which provides information about a destination through voice or text, and thereby may provide location information about a destination that may not be displayed on a map.

The present invention also provides a navigation system and method which exchanges location information through a messenger to ascertain and display locations of a plurality of vehicles.

The present invention also provides a navigation system and method which may exchange location information through a messenger, and display a route to a destination from a location of each of at least one navigation device based on destination information inputted by a navigation device.

Technical Solutions

According to an aspect of the present invention, there is provided a navigation system exchanging location information through a messenger, the navigation system includes a messenger program-installed navigation device which includes a communication device, transmits/receives messenger information including the location information to/from another navigation device, and displays the location information received through the message program on a map for route guidance.

According to another aspect of the present invention, there is provided a navigation method of exchanging location information through a messenger, the navigation method including: receiving navigation device location information about a location of another navigation device; determining whether the navigation device location information can be displayed on the map displayed in a navigation device; retrieving a map corresponding to the navigation device location information; dividing a screen of the navigation device, displaying the retrieved map corresponding to the navigation device location information in one part of a split screen of the navigation device, and a map currently displayed in the navigation device in another part of the split screen of the navigation device; and additionally displaying a location corresponding to the navigation device location information on the map displayed in the navigation device.

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention.

Advantageous Effects

According to an embodiment of the present invention, a navigation system and method of exchanging location information through a messenger provides information about a destination through voice or text, and thereby may provide location information about a destination that may not be displayed on a map.

Also, according to an embodiment of the present invention, a navigation system and method exchanges location information through a messenger to ascertain and display locations of a plurality of vehicles.

Also, according to an embodiment of the present invention, in a navigation system and method of exchanging location information through a messenger, when destination information inputted by a navigation device is transmitted to at least one other navigation device, each of the at least one navigation device sets a route based on the received destination information, and thus every vehicle having the at least one navigation device is installed is not required to separately input a destination and set a route.

BEST MODE FOR CARRYING OUT THE INVENTION

Hereinafter, embodiments of the present invention are described in detail by referring to the figures.

Figure 1:
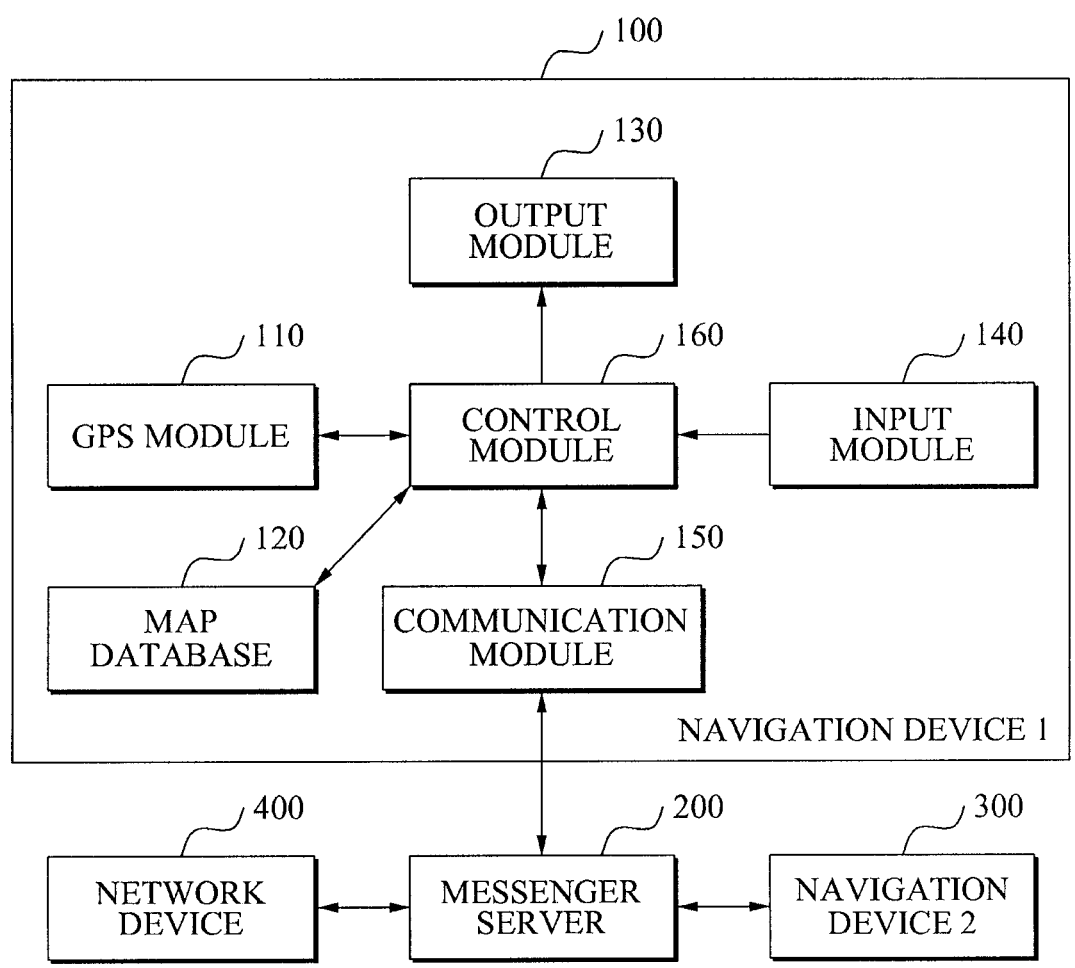
FIG. 1 is a block diagram illustrating a configuration of a navigation system of exchanging location information through a messenger according to an embodiment of the present invention.

FIG. 1 is a block diagram illustrating a configuration of a navigation system exchanging location information through a messenger according to an embodiment of the present invention.

The navigation system includes a navigation device (1) 100, a messenger server 200, a navigation device (2) 300, and a network device 400. The navigation device (2) 300 may be at least one navigation device, and the network device 400 may be at least one network device, as illustrated in FIG. 1.

The navigation device (1) 100 has a network communication function and a messenger function. As illustrated in FIG. 1, the navigation device (1) 100 includes a Global Positioning System (GPS) module 110, map database 120, output module 130, input module 140, communication module 150, and control module 160.

The GPS module 110 may be a GPS receiver. The GPS module 110 receives a location signal and/or a time signal (hereinafter, referred to as "GPS signal") of at least three different satellites from a plurality of GPS satellites, and thereby may generate location information of the navigation device (1) 100.

The map database 120 stores information about a map to display the location information generated by the GPS module 110. The information about the map includes information about roads, buildings, mountains, rivers, and the like throughout a country.

The output module 130 displays a map and location information matched with the map by the control module 160. Also, the output module 130 displays information transmitted through a messenger software installed in the control module 160.

The output module 130 supports a split screen function. Accordingly, the output module 130 may divide a screen into at least one map corresponding to location information about at least one navigation device, and simultaneously display the at least one map.

The output module 130 includes a Text To Speech (TTS) function, and thereby may output the location information transmitted through the messenger software via a speech output.

The input module 140 is for receiving a destination or contents to be transmitted through the messenger. In general, a touch screen or a connected external device such as a keyboard may be used as the input module 140. The touch screen may also be used as the output module 130.

The communication module 150 is connected to an external network, for example, a wireless Internet, and the like, to transmit/receive the location information.

The control module 160 includes a messenger program and a navigation program. The control module 160 processes messenger information transmitted through the messenger program using the navigation program, and displays a process result on the output module 130.

The messenger program transmits the messenger information inputted in the input module 140 to the navigation device (2) 300 through the communication module 150, and displays the messenger information received in the communication module 150 on the output module 130.

The messenger information may include destination information, navigation device location information, destination description information, and communication information.

The destination information is associated with a destination of the navigation device (2) 300.

The navigation device location information is associated with a location of the navigation device (1) 100.

The destination description information includes destination text information and destination alarm information. The destination description information and the destination information are transmitted to a particular portion during conversation through the messenger. The messenger program transmits the destination information and only destination alarm information of the received destination description information to the navigation program. When an alarm signal is transmitted, the navigation program displays contents of the destination text information.

For example, information such as "drive north at an intersection, enter a road of OO hospital, and a third building of the road: 100 M" is inputted, "drive north at an intersection, enter a road of OO hospital, and a third building of the road" may correspond to the destination text information and "100 M" may correspond to the destination alarm information.

The conversation information through the messenger is associated with information about a conversation between a user of the navigation device (1) 100 and a user of the navigation device (2) 300 or a user of the network device 400 through the messenger program.

When the destination information, navigation device location information, and destination description information are included in the received messenger information, the messenger program transmits the messenger information to the navigation program.

When contents indicating that the location information is to be transmitted are received from the input module 140, the messenger program transmits the location information generated in the GPS module 110 to a navigation device connected to the messenger.

The messenger program may be installed in the navigation device (1) 100, navigation device (2) 300, and network device 400. Also, the messenger program enables a conversation and information transmission among the navigation device (1) 100, navigation device (2) 300, and network device 400 to be performed through the messenger server 200.

The navigation program calculates its location based on the location information generated in the GPS module 100, and retrieves map information corresponding to the calculated location in the map database 120. Also, the navigation program map-matches its location to the retrieved map information and displays. When a destination is inputted in the input module 140, the navigation program retrieves map information between the destination and its location in the map database 120, computes and displays on the output module 130 a shortest route between the destination and the location based on the map information.

When the destination information is transmitted from the messenger program, the navigation program retrieves an entire map between the received destination information and its location, computes and displays on the output module 130 a shortest route between the destination and the location based on the retrieved map.

When the navigation device location information is transmitted from the messenger program, the navigation program retrieves map information corresponding to the received navigation device location information in the map database 120, and map-matches the navigation device location information to the retrieved map information. Also, the navigation program displays a map corresponding to the map-matched navigation device location information on the output module 130.

Figure 2:
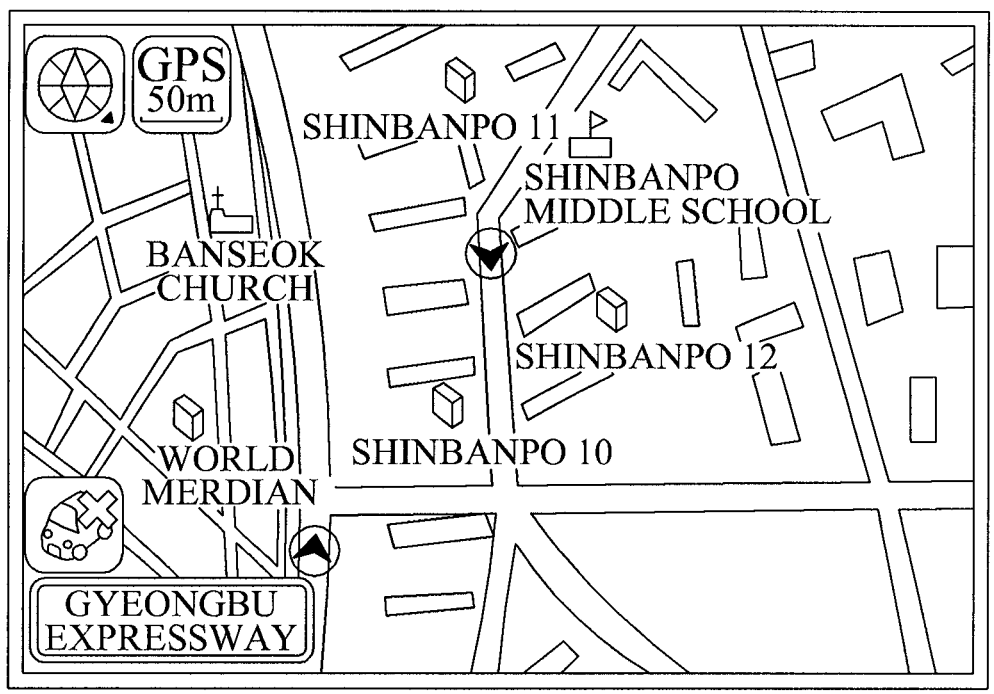
FIG. 2 is a diagram illustrating an example when locations of a navigation device (1) and a navigation device (2) may be displayed on a map according to an embodiment of the present invention.
Figure 3:
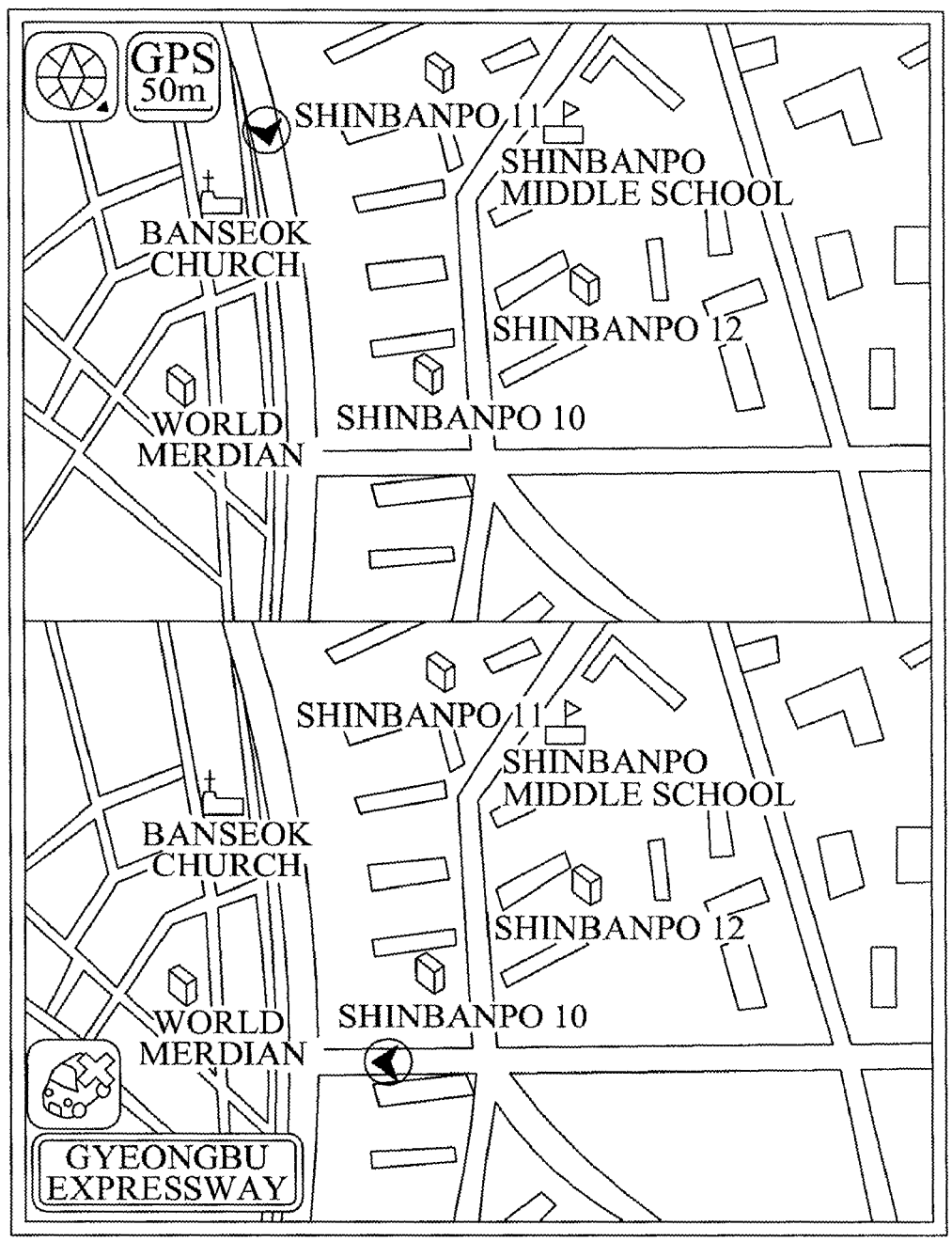
FIG. 3 is a diagram illustrating an example when locations of a navigation device (1) and a navigation device (2) may not be displayed on a map according to an embodiment of the present invention.

In this instance, when the received navigation device location information may be displayed on the map where its location is matched, locations of two navigation devices may be displayed on the single map as illustrated in FIG. 2. When the received navigation device location information is too far to be displayed on the map, a screen of the output module 130 may be divided and the two locations may be simultaneously displayed as illustrated in FIG. 3.

When the destination information and the navigation device location information are transmitted from the messenger program, the navigation program may display a map of a shortest route between the destination information and the navigation device location information, and a map of a shortest route between the received destination information and its location, on the output module 130. In this instance, the map of the shortest route between the destination information and the navigation device location information may be obtained by retrieving an entire map between the received destination information and navigation device location information in the map database 120, and computing the shortest route between the destination information and the navigation device location information based on the retrieved map information. Also, the map of the shortest route between the received destination information and its current location may be obtained by retrieving an entire map between the destination information and its location and computing the shortest route between the destination information and the location based on the retrieved map information.

When the destination information and the destination description information are transmitted from the messenger program, the navigation program may set an alarm region having a radius which is a distance from the destination. The distance is designated in the destination alarm information. When a location corresponding to the location information generated in the GPS module 110 moves into the alarm region, the navigation program may transmit an alarm signal to the messenger program.

The messenger server 200 relays the conversation or information among the navigation device (1) 100, navigation device (2) 300, and network device 400.

The navigation device (2) 300 may include a same configuration as the navigation device (1) 100, and transmit the conversation or information to the navigation device (1) 100.

The network device 400 may transmit/receive the conversation or information to the messenger server 200 through the Internet or a wireless network.

The network device 400 may internally store map information or display a location of a corresponding navigation device using navigation device location information included in received messenger information on a map. A web messenger is installed in the network device 400.

A navigation method exchanging location information through a messenger according to an embodiment of the present invention may transmit/receive information and conversation from/to the navigation device (2) 300 or the network device 400 through the messenger program installed in the navigation device (1) 100. When the messenger information is received, the navigation method may perform navigation depending on a type of the received messenger information.

Also, when the destination information is received, the navigation method may compute a route to a destination corresponding to the received destination information, and display on the output module 130. Accordingly, a user that is not familiar with the navigation system may easily retrieve the route to the destination using information externally received.

Also, when the navigation device location information is received, the navigation method may simultaneously display a location of the navigation device (2) 300 transmitting the navigation device location information and a location of the navigation device (1) 100, which is described in detail with reference to FIG. 4.

Also, when the destination information and the destination description information are simultaneously received, the navigation method may set and display a route based on the destination information. When the destination is located a predetermined distance ahead, a characteristic of the destination is displayed as a text. The predetermined distance is set in the destination alarm information, and the characteristic is designated in the destination text information. In this instance, when a TTS is used, the characteristic of the destination may be provided in voice. Accordingly, a user that does not look at the navigation device (1) 100 closely may recognize the characteristic.

When the destination information and the navigation device location information are simultaneously received, the navigation method may simultaneously display the location of the navigation device (2) 300 transmitting the navigation device location information, the location of the navigation device (1) 100, and each route to the destination. Also, the navigation method may determine an intermediate point between the navigation device (1) 100 and the navigation device (2) 300 through the messenger by comparing the routes.

Figure 4:
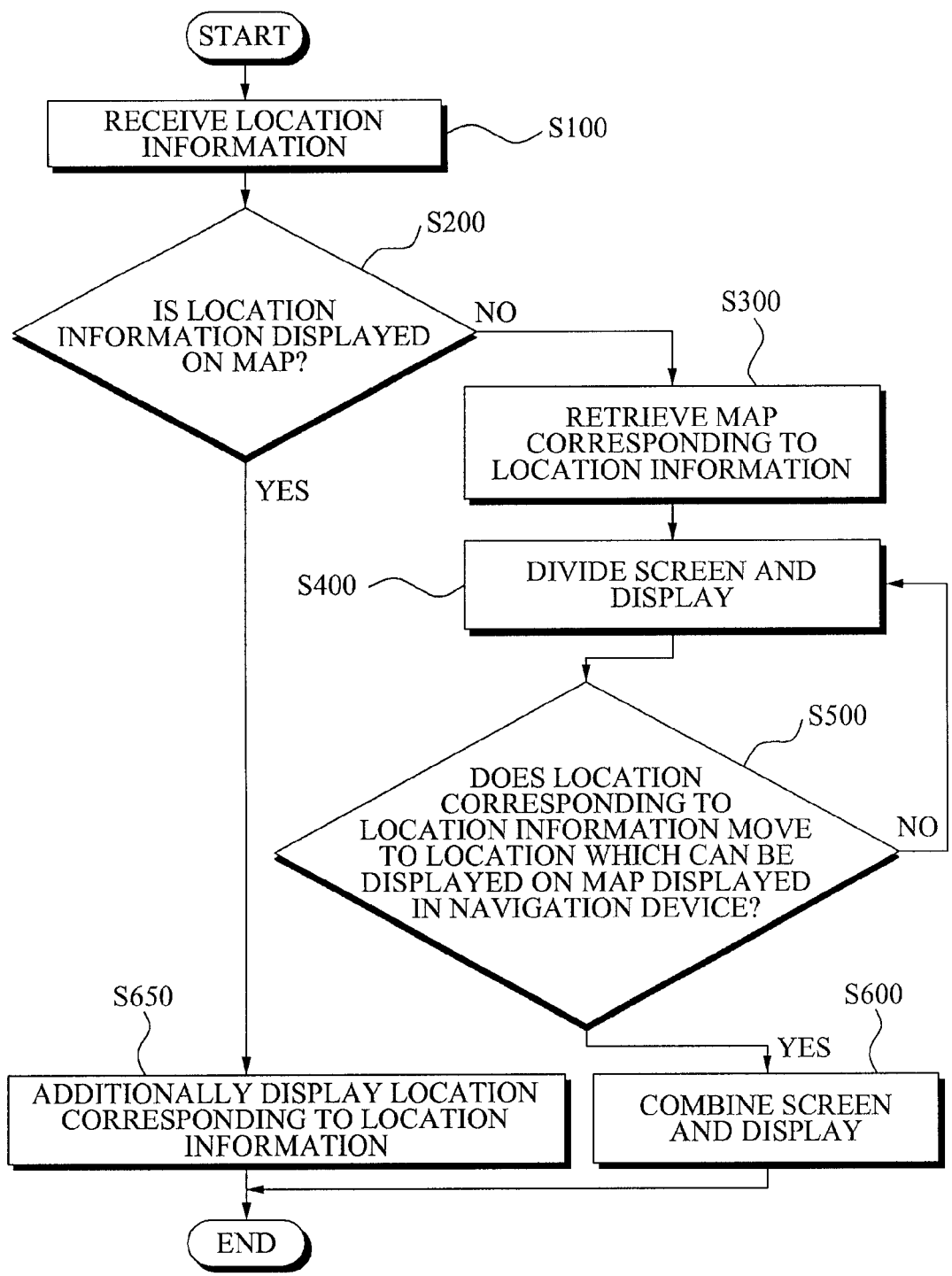
FIG. 4 is a flowchart illustrating a method of simultaneously displaying locations of a plurality of navigation devices based on location information transmitted through a messenger according to an embodiment of the present invention.

FIG. 4 is a flowchart illustrating a method of simultaneously displaying locations of a plurality of navigation devices based on location information transmitted through a messenger according to an embodiment of the present invention.

As illustrated in FIG. 4, the method, that is, a navigation method of exchanging location information through a messenger, may include receiving location information in operation S100, determining whether the location information may be displayed on a map currently displayed in operation S200, retrieving a map corresponding to the location information in operation S300, dividing a screen and displaying in operation S400, determining whether the location information may be displayed on a map currently displayed in operation S500, combining the screen and displaying in operation S600, and additionally displaying the received location information in operation S650.

In operation S100, a messenger program of a control module 160 transmits the location information of messenger information to a navigation program through a communication module 150. The messenger information is received from a navigation device (2) 300.

In operation S200, the navigation program determines whether a location corresponding to the location information exists in a currently displayed map of a navigation device (1) 100.

In operation S300, when the location corresponding to the location information does not exist in the currently displayed map, the navigation program retrieves a map corresponding to the location information in a map database 120.

In operation S400, the navigation program divides the screen displayed on an output module 130 as illustrated in FIG. 3. Also, the navigation program displays the map of the navigation device (1) 100 and a location of the navigation device (1) 100 in one part of a split screen, and displays the location information and the map retrieved in operation S300 in another part of the split screen.

In operation S500, the navigation program checks the location information in real time or at regular times, and determines whether the location information moves to a location on the map of the navigation device (1) 100, that is, a location which may be displayed on the currently displayed map.

In operation S600, the navigation program stops displaying the map retrieved in operation S300 in the screens divided in operation S400. As illustrated in FIG. 2, the navigation program displays the location information and the location of the navigation device (1) 100 on the map of the navigation device (1) 100.

In operation S650, the navigation program that determines whether the location corresponding to the location information exists in the map of the navigation device (1) 100 additionally displays the location information on the map of the navigation device (1) 100, as illustrated in FIG. 2.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A navigation system processing location information through a messenger, the navigation system comprises a navigation device wherein
the navigation device comprises:
a control module including a messenger program and a navigation program,
a communication module transmitting/receiving messenger information including the location information to/from other navigation device, and
an output module displaying the location information received through the messenger program on a map,
wherein the messenger information includes at least one of destination information about a destination of the other navigation device, navigation device location information about a location of the navigation device, destination description information including text information about the destination, and communication information through the messenger.

2. The navigation system of claim 1, wherein the destination description information includes destination text information which is the text information about the destination, and destination alarm information which determines whether to display the destination text information when the destination is located a predetermined distance away.

3. The navigation system of claim 2, wherein
control module sets an alarm region, and when the navigation device moves into the alarm region, and
the output module displays the destination text information, the alarm region having a radius which is the predetermined distance from the received destination information.

4. The navigation system of claim 2, wherein the output module includes a Text To Speech (TTS) function, and outputs the destination text information through voice.

5. The navigation system of claim 1, wherein the control module retrieves a map between the received destination information and the location of the navigation device, and the output module displays a shortest route based on the map.

6. The navigation system of claim 1, wherein
the control module map-matches a map corresponding to the received navigation device location information to another navigation device location information, and
the output module displays the map with respect to a location of the navigation device and a map corresponding to the other navigation device location information, the other navigation device location information being location information about the other navigation device transmitting the navigation device location information.

7. The navigation system of claim 6, wherein the output module supports a screen division function, and simultaneously displays at least one map corresponding to a location of each of at least one navigation device.

8. The navigation system of claim 7, wherein the output module displays the navigation device and the other navigation device when the received navigation device location information can be displayed on the map where the location of the navigation device is matched, and divides a screen to simultaneously display the map of the navigation device and the map of the other navigation device when the received navigation device location information is too far away to be displayed on the map where the location of the navigation device is matched.

9. The navigation system of claim 1, wherein the messenger program installed in the navigation device control module is installable in another device using a wired/wireless network.

10. The navigation system of claim 9, further comprising:
a network device which is connectable to a network, transmits/receives the destination information, the destination description information including the text information about the destination to/from the navigation device, and the conversion information through the messenger, the messenger program being installed in the network device.

11. The navigation system of claim 9, wherein the network device stores map information, or uses a map through a network using a web messenger installed in the network device.

12. A navigation method of exchanging location information through a messenger, the navigation method comprising:
receiving navigation device location information about a location of another navigation device;
determining whether the navigation device location information can be displayed on the map displayed in a navigation device;
retrieving a map corresponding to the navigation device location information;
dividing a screen of the navigation device, displaying the retrieved map corresponding to the navigation device location information in one part of a split screen of the navigation device, and a map currently displayed in the navigation device in another part of the split screen of the navigation device; and
additionally displaying a location corresponding to the navigation device location information on the map displayed in the navigation device.

13. The navigation method of claim 12, further comprising:
determining whether the location corresponding to the navigation device location information moves to a location which can be displayed on the map displayed in the navigation device; and combining the screen of the navigation device and displaying a location of the navigation device and the location corresponding to the navigation device location information on the map.

* * * * *